(12) United States Patent
Lin et al.

(10) Patent No.: US 8,339,380 B2
(45) Date of Patent: Dec. 25, 2012

(54) OPTICAL OPERATING APPARATUS AND METHOD FOR DETERMINING OPERATION MOTION

(75) Inventors: Cho-Yi Lin, Hsinchu (TW); Yao-Ching Hsu, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 1261 days.

(21) Appl. No.: 12/119,641

(22) Filed: May 13, 2008

(65) Prior Publication Data

US 2009/0211820 A1 Aug. 27, 2009

(30) Foreign Application Priority Data

Feb. 26, 2008 (TW) ................................ 97106697 A

(51) Int. Cl.
*G06F 3/042* (2006.01)
(52) U.S. Cl. .......................... 345/176; 345/173; 345/175
(58) Field of Classification Search .................. 345/173, 345/175, 176; 359/196.1
See application file for complete search history.

(56) References Cited

U.S. PATENT DOCUMENTS

| 4,484,179 A | 11/1984 | Kasday |
| 4,782,328 A | 11/1988 | Denlinger |
| 6,816,537 B2 | 11/2004 | Liess |
| 7,956,842 B2 | 6/2011 | Ting |
| 2008/0007540 A1* | 1/2008 | Ostergaard ................... 345/176 |
| 2008/0088593 A1 | 4/2008 | Smoot |

FOREIGN PATENT DOCUMENTS

| TW | 200601127 A | 1/2006 |
| TW | 200705249 A | 2/2007 |
| TW | M316972 U | 8/2007 |
| TW | 200813793 A | 3/2008 |

* cited by examiner

*Primary Examiner* — Amare Mengistu
*Assistant Examiner* — Jennifer Zubajlo
(74) *Attorney, Agent, or Firm* — Chun-Ming Shih

(57) ABSTRACT

An optical operating apparatus includes a soft plate, a transparent supporting plate, a deformable unit, a light source, and an image sensing module. The soft plate is configured for being pressed. The transparent supporting plate is disposed under the soft plate. The deformable unit is disposed between the transparent supporting plate and the soft plate, and has a pattern configuration. The deformable unit deforms as applying an external force on the soft plate and restores after the external force is removed. The light source is configured for providing a light beam to the transparent supporting plate and the deformable unit, and the light beam is reflected by the deformable unit. The image sensing module is arranged on a transmitting path of the light beam reflected by the deformable unit, and a visual field of the image sensing module covers the whole deformable unit. In addition, the present invention also relates to a method for determining operation motion.

18 Claims, 8 Drawing Sheets

OPTICAL OPERATING APPARATUS AND METHOD FOR DETERMINING OPERATION MOTION

BACKGROUND OF THE INVENTION

1. Field of the Invention

The present invention relates to an operating apparatus, particularly, to an optical operating apparatus and a method for determining operation motion applied in the optical operating apparatus.

2. Description of Related Art

With the development of flat panel display technology, more and more electronic products have a screen. In these electronic products, many products are operated by moving the cursors in the screens. Generally, two typical operating apparatuses, i.e., resistive operating apparatus and capacitive operating apparatus, are used to move the cursor in the screen. Because the resistive operating apparatus has low sensitivity, in practical application, the resistive operating apparatus is prone to suffer too much pressure and tends to be damaged. In addition, the capacitive operating apparatus has high price, and is easy to cause operating error because of static electronic force or humidity.

Furthermore, a conventional joystick is used as an operating apparatus for operating video game. Recently, an operating apparatus capable of being controlled by feet of an user is developed. The feet of the user are placed on the operating apparatus, and a pressure change of the feet can be sensed. According to the sensed pressure change, the operating apparatus controls a role in the video game doing a corresponding operation motion. However, the operating apparatus still belongs to resistive operating apparatus or capacitive operating apparatus.

BRIEF SUMMARY

An optical operating apparatus having a high reliability is provided.

A method for determining operation motion is applied in an optical operating apparatus, and therefore the optical operating apparatus has a pointing function and a keystroke function.

In order to achieve the above-mentioned merits, an embodiment of an optical operating apparatus is provided. The optical operating apparatus includes a soft plate, a transparent supporting plate, a deformable unit, a light source, and an image sensing module. The soft plate is configured for being pressed. The transparent supporting plate is disposed under the soft plate. The deformable unit is disposed between the transparent supporting plate and the soft plate, and has a pattern configuration. The deformable unit deforms as applying an external force on the soft plate and restores after the external force is removed. The light source is configured for providing a light beam to the transparent supporting plate and the deformable unit, and the light beam is reflected by the deformable unit. The image sensing module is arranged on a transmitting path of the light beam reflected by the deformable unit, and a visual field of the image sensing module covers the whole deformable unit.

In one embodiment of the present invention, the deformable unit is comprised of an elastic material.

In one embodiment of the present invention, the pattern configuration can be a predetermined reticular structure or a multi-line shaped structure.

In one embodiment of the present invention, the image sensing module is disposed under the transparent supporting plate.

In one embodiment of the present invention, the optical operating apparatus additionally comprises a light guide plate disposed between the transparent supporting plate and the image sensing module, and the light source is disposed adjacent to an incident surface of the light guide plate.

In one embodiment of the present invention, the optical operating apparatus additionally comprises a lens disposed between the transparent supporting plate and the image sensing module.

In one embodiment of the present invention, the optical operating apparatus additionally comprises a lens disposed under the transparent supporting plate. The lens has a flat surface, a first convex curve surface and a second convex curve surface. The first and second convex curve surfaces connect with two opposite ends of the flat surface. The flat surface is opposite to the transparent supporting plate, and the first convex curve surface is opposite to the second convex curve surface. The light source is disposed adjacent to the first convex curve surface, and the image sensing module is disposed adjacent to the second convex curve surface.

In one embodiment of the present invention, the optical operating apparatus additionally comprises a lens disposed under the transparent supporting plate. The lens has a first convex curve surface and a second convex curve surface adjacent to the first convex curve surface. The first convex curve surface is opposite to the transparent supporting plate, and the image sensing module is disposed adjacent to the second convex curve surface.

In one embodiment of the present invention, the optical operating apparatus additionally comprises a filter disposed in front of the image sensing module for filtering off light rays whose wavelengths are out of a wavelength range of the light beam provided by the light source.

In one embodiment of the present invention, the light source is an infrared light emitting diode.

In one embodiment of the present invention, the optical operating apparatus additionally comprises a reflective pattern layer disposed between the deformable unit and the transparent supporting plate for reflecting the light rays whose wavelengths are in a wavelength range of the light beam provided by the light source. A shape of the reflective pattern layer is similar to a shape of the pattern configuration of the deformable unit.

In one embodiment of the present invention, the light source is a laser diode or a light emitting diode.

In one embodiment of the present invention, the image sensing module comprises a sensing element and a processing element. The visual field of the sensing element covers the whole deformable unit. The processing element electrically connects with the sensing element and the light source.

In one embodiment of the present invention, the sensing element and the processing element are integrated into a system-on-chip.

In one embodiment of the present invention, the optical operating apparatus additionally comprises a housing having an opening. The soft plate is disposed at the opening, and the transparent supporting plate, the deformable unit, the light source and the image sensing module are disposed inside the housing.

A method for determining operation motion applied in the above-described optical operating apparatus includes the following steps. Firstly, a deformed position and a deformed size of the deformable unit of the optical operating apparatus are sensed by the image sensing module of the optical operating apparatus in different times. Secondly, an operation motion is determined as moving or pressing by the image sensing module according to the deformed position and deformed size of the deformable unit.

In one embodiment of the present invention, when the deformed position of the deformable unit changes along with the time, the operation motion is determined as moving.

In one embodiment of the present invention, when a portion of the deformed size of the deformable unit changes along with the time, the operation motion is determined as pressing.

The optical operating apparatus of the present invention employs the optical manner to sense the pressure force, therefore, any operating error caused by static electronic force or humidity can be prevented. In addition, the pressure force presses the soft plate and the deformable unit, and the image sensing module is not pressed, thereby avoiding a damage of the image sensing module. Therefore, the optical operating apparatus of the present invention has a high reliability. Furthermore, the method for determining operation motion can determine the operation motion according to the deformed position and the deformed size of the deformable unit in different times, and thereby the optical operating apparatus has a pointing function and a keystroke function.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
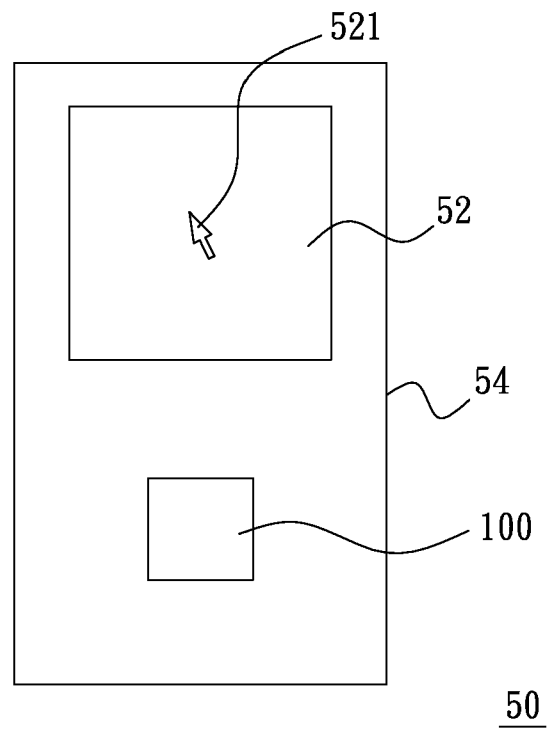
FIG. 1A is a schematic view of a portable electronic product having an optical operating apparatus of an embodiment of the present invention.
Figure 1B:
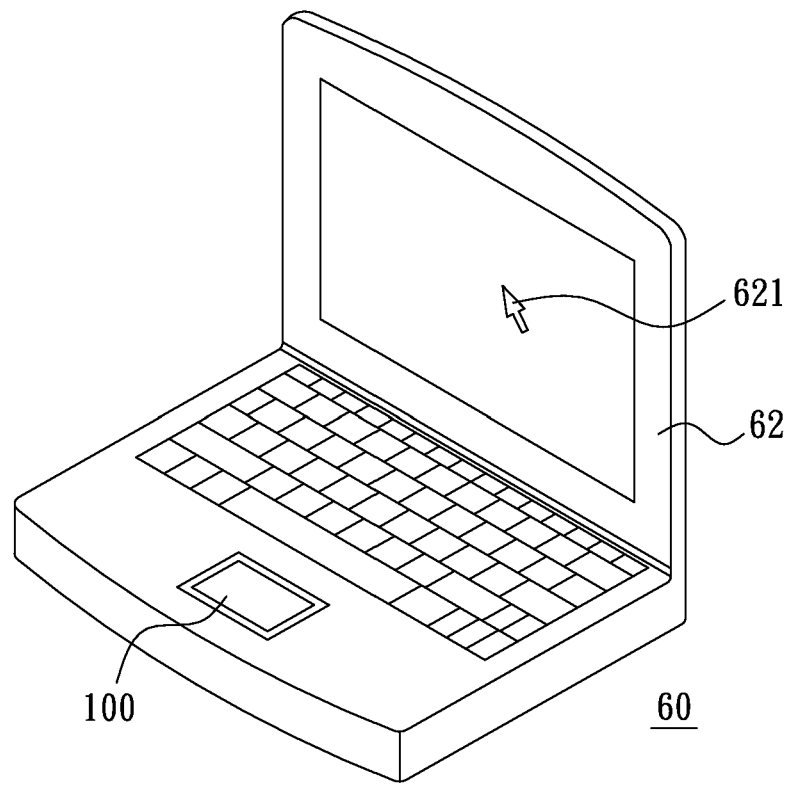
FIG. 1B is a schematic view of a notebook PC having the optical operating apparatus of the embodiment of the present invention.

Referring to FIG. 1A, an optical operating apparatus 100 of the present embodiment can be integrated into a portable electronic product 50 which may be a mobile phone, a person digital assistant (PDA) or a MP3 player. The optical operating apparatus 100 can be operated to control a cursor 521 in a screen 52 of the portable electronic product 50 by a finger or a pen-shaped object. In addition, as shown in FIG. 1B, the optical operating apparatus 100 can also be integrated into a notebook PC 60, and therefore a moving of a cursor 621 in a screen 62 of the notebook PC 60 can be controlled by a finger.

Figure 2A:
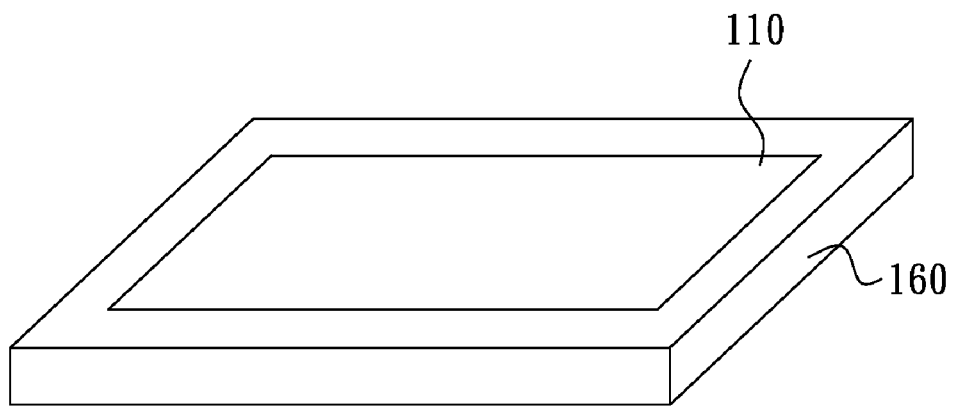
FIGS. 2A and 2B show a schematic view of two optical operating apparatus in accordance with another two embodiments of the present invention.
Figure 2B:
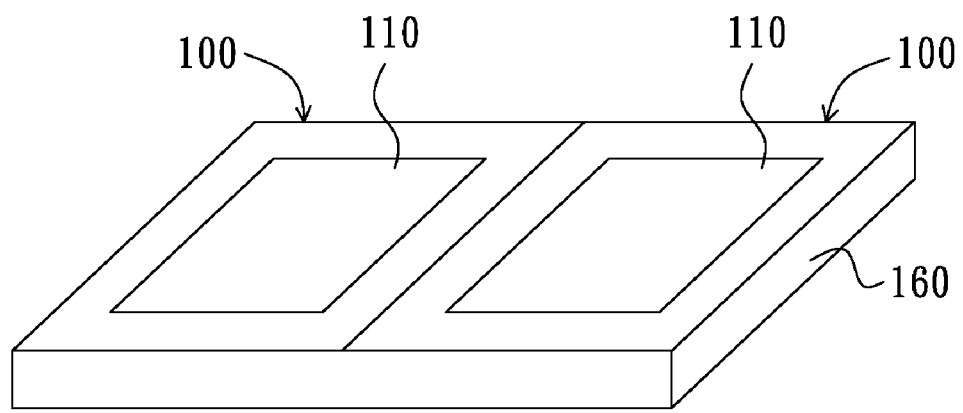
Figure 2C:
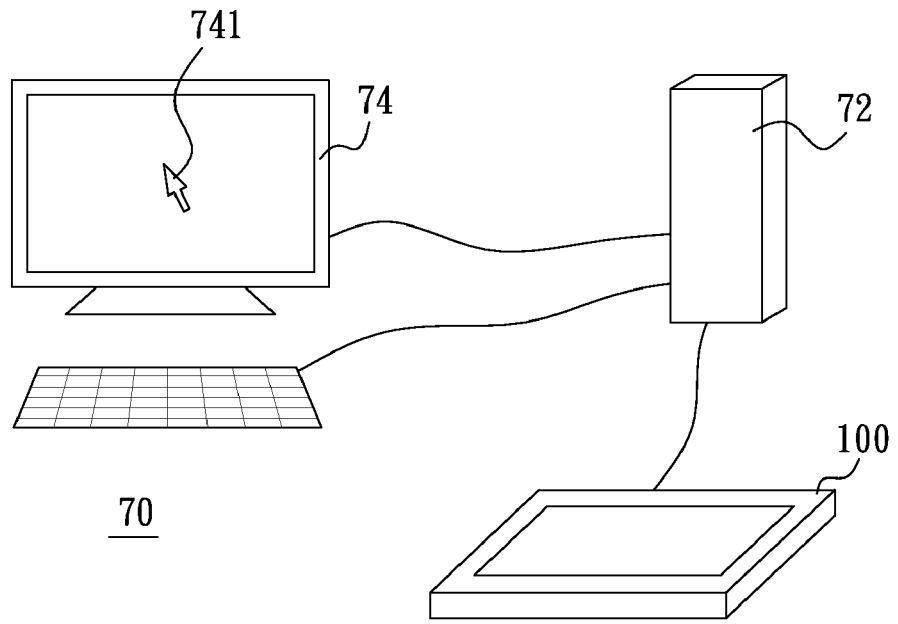
FIG. 2C is a schematic view of the optical operating apparatus of the embodiment of the present invention applied in a desktop PC.

Referring to FIG. 2A, the optical operating apparatus 100 may be an isolated apparatus which can be used as an operating apparatus of a video game. A hand or a foot of an user can be placed on the optical operating apparatus 100. In addition, two optical operating apparatuses 100 can be integrated into one unit (as shown in FIG. 2B), thus two hands or two feet of the user can be used to control/manage the integrated optical operating apparatus 100. Furthermore, as shown in FIG. 2C, the optical operating apparatus 100 may electrically connect to a computer 72 of a desktop PC 70, thus a moving of a cursor 741 in a screen 74 can be controlled by the finger. A detailed configuration of the optical operating apparatus 100 will be described in the following.

Figure 3:
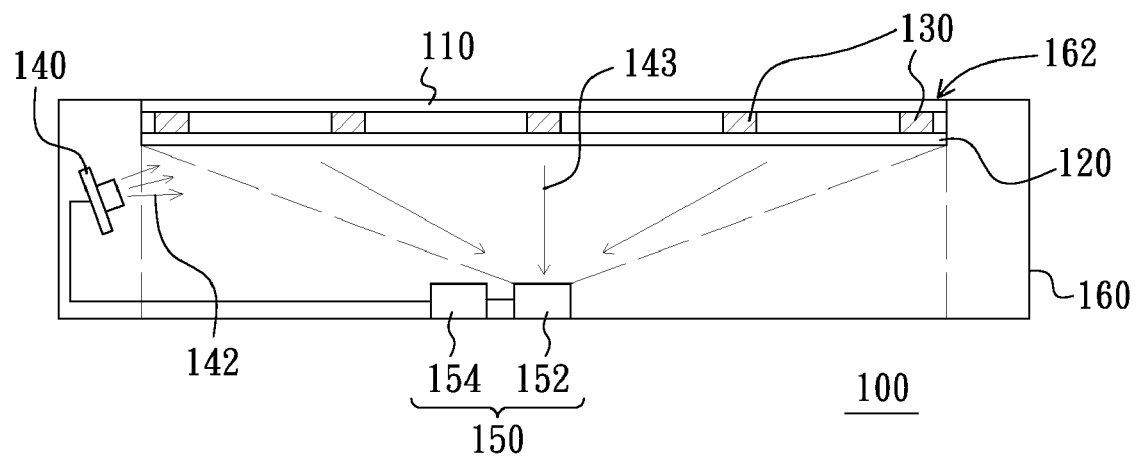
FIG. 3 is a schematic view of an optical operating apparatus of another embodiment of the present invention.
Figure 4:
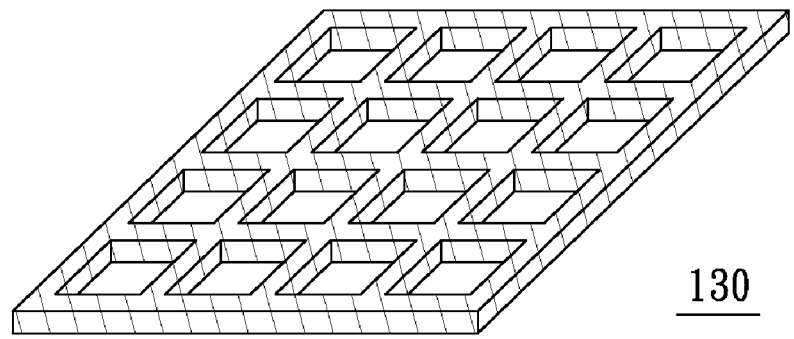
FIG. 4 is a three-dimensional view of a deformable unit of the optical operating apparatus of FIG. 3.

Referring to FIGS. 3 and 4, the optical operating apparatus 100 includes a soft plate 110, a transparent supporting plate 120, a deformable unit 130, at least a light source 140, and an image sensing module 150. The soft plate 110 is configured for being pressed by the user. The transparent supporting plate 120 is disposed under the soft plate 110. The deformable unit 130 is arranged between the soft plate 110 and the transparent supporting plate 120, and has a pattern configuration (e.g., a predetermined reticular configuration). The deformable unit 130 deforms as applying an external force on the soft plate 110 and restores after the external force is removed. The light source 140 is configured for providing a light beam 142 to the transparent supporting plate 120 and the deformable unit 130, and the light beam 142 can be reflected by the deformable unit 130. The image sensing module 150 is arranged on a transmitting path of the light beam 143 reflected by the deformable unit 130, and a visual field (i.e., a sensing range) of the image sensing module 150 covers the whole deformable unit 130.

In the above-described optical operating apparatuses 100, the image sensing module 150 can be arranged under the transparent supporting plate 120. The image sensing module 150 includes a sensing element 152 and a processing element 154. The processing element 154 is electrically connected between the sensing element 152 and the light source 140. The visual field of the sensing element 152 covers the whole deformable unit 130. The sensing element 152 may be a complementary metal-oxide-semiconductor (CMOS) image sensor or a charge coupled device (CCD). Moreover, the sensing element 152 and the processing element 154 can be integrated into a system-on-chip (SoC).

In addition, the optical operating apparatuses 100 can additionally include a housing 160. The housing 160 has an opening 162, and the soft plate 110 is disposed at the opening 162. The transparent supporting plate 120, the deformable unit 130, the light source 140 and the image sensing module 150 are disposed inside the housing 160. When the optical operating apparatus 100 is incorporated into the portable electronic product 50 (as shown in FIG. 1), the housing 160 can be integrated with a case 54 of the portable electronic product 50.

The light source 140 may be a light emitting diode (LED) or a laser diode (LD). The soft plate 110 may be comprised of plastic, rubber, thermoplastic elastomer (TPE), or other flexible or elastic materials. The transparent supporting plate 120 may be comprised of glass, polyacrylate, resin, rubber, TPE or other transparent materials. The deformable unit 130 is comprised of an elastic material such as silica gel, latex, sponge, rubber, TPE or the like.

In the present embodiment, because the deformable unit 130 is fixed between the soft plate 110 and the transparent supporting plate 130, when the user presses the soft plate 110, the soft plate 110 and the deformable unit 130 deform accordingly. Furthermore, the light beam 143 reflected by the deformable unit 130 transmits to the image sensing module 150. The light beam 143 is converted into an image data by the image sensing module 150. According to compare the image data got in different times, whether the deformable unit 130 deforms or not is determined, and the deformed position of the deformable unit 130 is determined. According to the determining result, the cursor or game role in the screen can be managed to do a corresponding motion.

Figure 5:
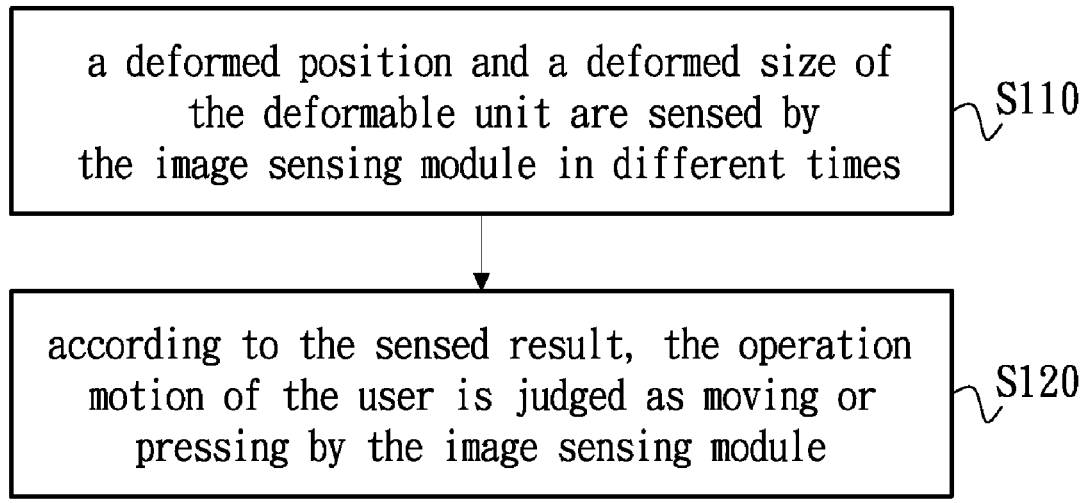
FIG. 5 is a flowchart of a method for determining operation motion of an embodiment of the present invention.

In detail, a method for determining operation motion is applied to the optical operating apparatuses 100. The method for determining operation motion includes the following steps. Referring to FIG. 5, in step S110, a deformed position and a deformed size of the deformable unit 130 are sensed by the image sensing module 150 in different times. In step S120, according to the sensed result of Step 110, the operation motion of the user is determined as moving or pressing by the image sensing module 150.

Figure 6A:
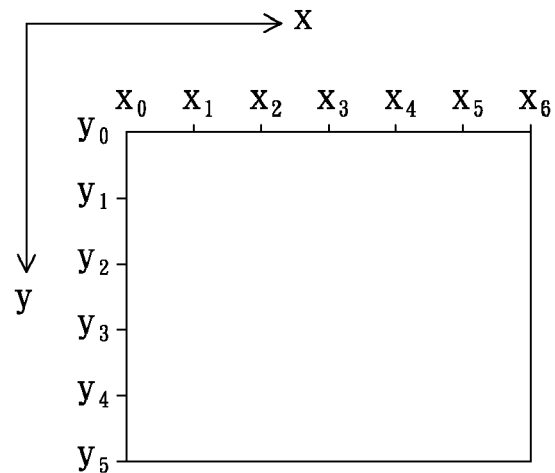
FIG. 6A is a schematic view of a sensing visual of an image sensing module of an optical operating apparatus of an embodiment of the present invention.
Figure 6B:
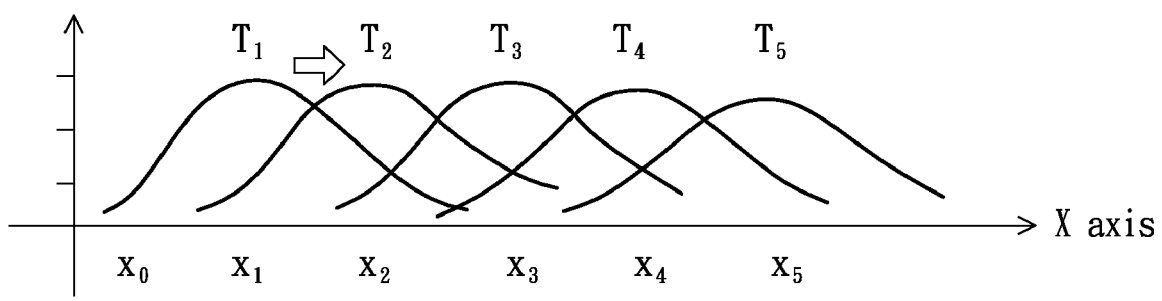
FIG. 6B shows a graph of waves sensed by the image sensing module in different times.

For example, referring to FIG. 6A, the visual field of the image sensing module 150 corresponds to the deformable unit 130. In a time T1, a position of the deformable unit 130 corresponding to a position X1 of the image sensing module 150 is pressed and deformed, then the position X1 on X axis of the image sensing module 150 senses a wave (as shown in FIG. 6B). In a time interval from T1 to T5, the wave sensed by the image sensing module 150 moves from X1 to X5, which means that the position of the deformable unit 130 pressed by the user moves from left to right along the X axis, therefore, the cursor or the game role in the screen generates a corresponding motion (i.e., moves from left to right) along the X axis. Similarly, when the wave sensed by the image sensing module 150 moves along the Y axis, the cursor or the game role in the screen can be controlled by the image sensing module 150 to generate a corresponding motion along the Y axis. In other words, when the deformed position of the deformable unit 130 changes along with the time, the image sensing module 150 determines the motion of the user as moving, thereby controlling the cursor or the game role in the screen to generate a corresponding moving motion.

Figure 7:
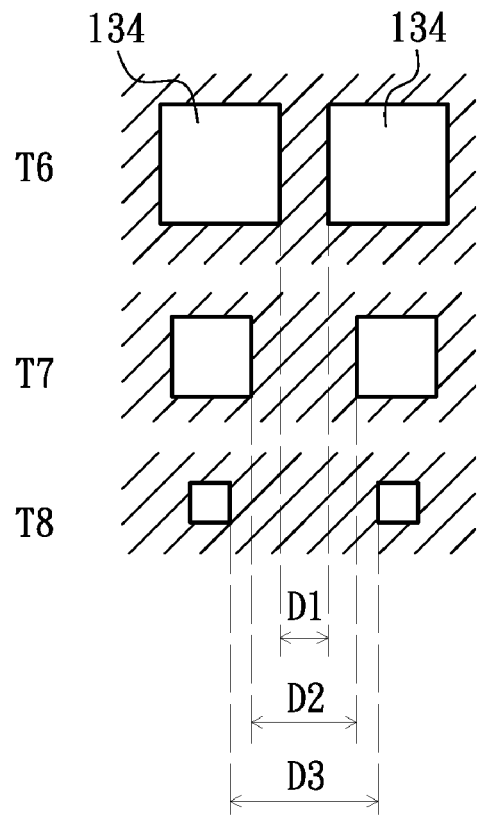
FIG. 7 shows a view of a deformed size of a deformable unit in different times.

In addition, when a portion of the deformed size of the deformable unit 130 changes along with the time, the operation motion of the user can be determined as pressing. The larger the pressure force pressed on the soft plate 110 and the deformable unit 130, the larger the deformed size of the soft plate 110 and the deformable unit 130. So, at least one critical deformed size can be predetermined and acted as a reference to determine which operation motion occurs on the soft plate 110. When a current deformed size excesses the predetermined critical deformed size, the predetermined operation motion corresponding to the predetermined critical deformed size can be determined. For example, referring to FIG. 7, a predetermined space between two adjacent openings 134 is denoted by D1. When the deformable unit 130 is pressed, D1 is changed correspondingly. For example, in a time T7 and a time T8, because the deformable unit 130 is pressed by different pressure forces (i.e., values of the pressure forces are different), the space between the two adjacent openings 134 is separately changed into D2 and D3. If a first predetermined critical deformed size Th1 and a second predetermined critical deformed size Th2 are defined, and D1, D2, D3, Th1 and Th2 meet a relationship: D1<Th1<D2<Th2<D3. In the time T7, because D2>Th1, therefore, the operation motion is determined to be the first predetermined operation motion. In the time T8, because D3>Th2, therefore, the operation motion is determined to be the second predetermined operation motion.

The optical operating apparatus 100 of the present embodiment employs an optical manner to sense the pressure force provided by the user, therefore, any operating error caused by static electronic force or humidity can be prevented. In addition, the pressure force presses the soft plate 110 and the deformable unit 130, and the image sensing module 150 is not pressed, thereby avoiding a damage of the image sensing module 150. Therefore, the optical operating apparatus 100 of the present embodiment has a high reliability. Moreover, because the larger the pressure force pressed on the soft plate 110 and the deformable unit 130, the larger the deformed size of the soft plate 110 and the deformable unit 130. Therefore, the optical operating apparatus 100 can be used as a weighing machine.

Figure 8:
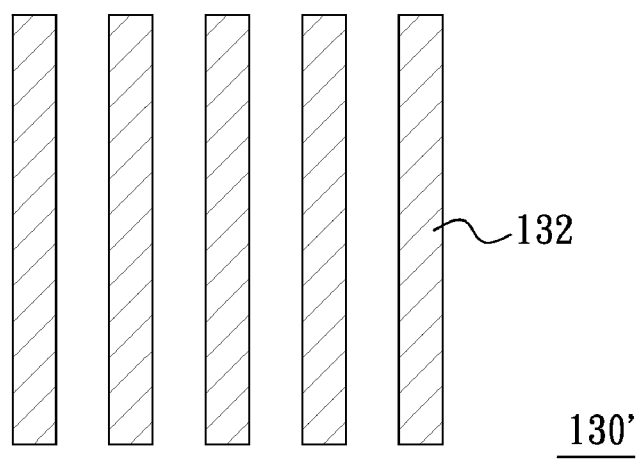
FIG. 8 is a top view of a deformable unit in accordance with another embodiment of the present invention.

It is noted that the pattern configuration of the deformable unit 130 is not limited to be reticular configuration. For example, referring to FIG. 8, in another embodiment, the deformable unit 130' of another optical operating apparatus is composed of a number of multi-line shaped structure 132.

Several embodiments of the optical operating apparatuses will be recited in the following. These optical operating apparatuses have similar configuration and merits with the above-mentioned optical operating apparatus 100, therefore, only the difference between the optical operating apparatuses and the optical operating apparatus 100 is separately described in the following.

Figure 9:
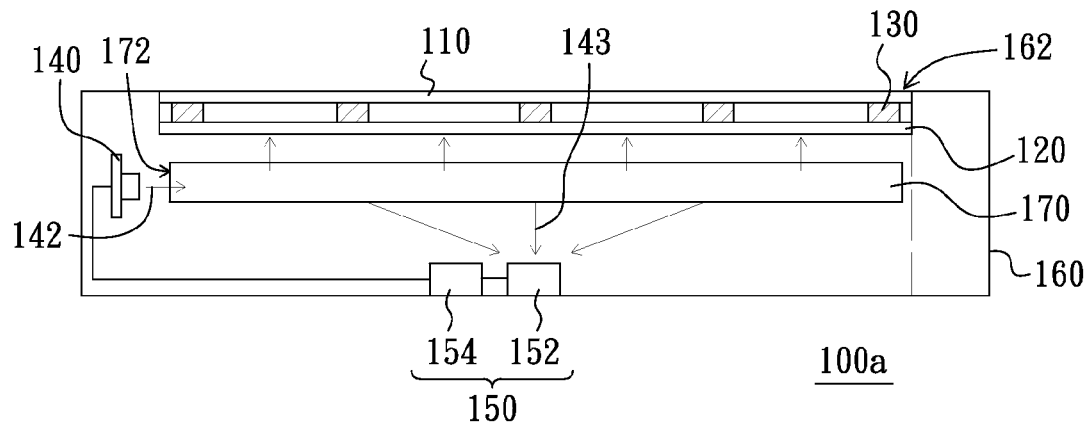
FIG. 9 is a schematic view of an optical operating apparatus in accordance with another embodiment of the present invention.

Referring to FIG. 9, compared with the optical operating apparatus 100 of FIG. 3, the optical operating apparatus 100a of the present embodiment additionally includes a light guide plate 170. The light guide plate 170 is disposed between the transparent supporting plate 120 and the image sensing module 150. The light source 140 is arranged adjacent to a light incident surface 172 of the light guide plate 170. The light guide plate 170 can guide the light beam 142 provided by the light source 140 to the deformable unit 130, thereby facilitating the image sensing module 150 determining the deformation of the deformable unit 130.

Figure 10:
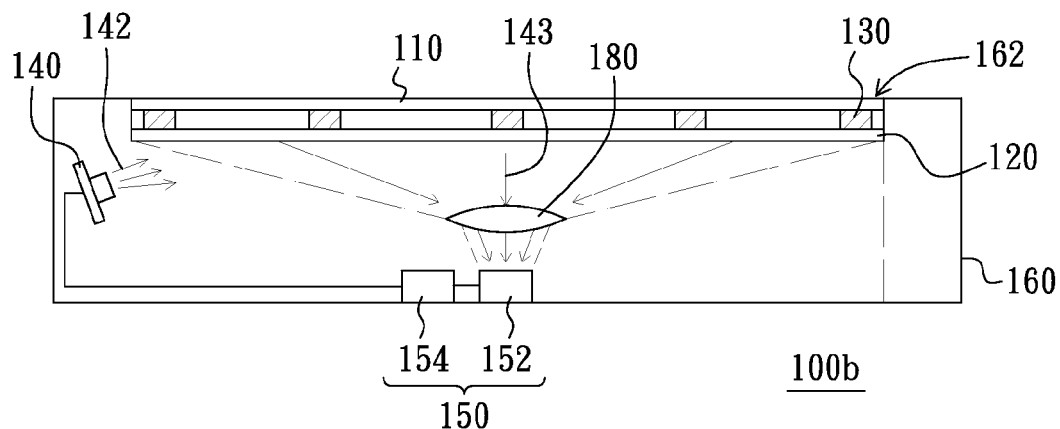
FIG. 10 is a schematic view of an optical operating apparatus in accordance with another embodiment of the present invention.

Referring to FIG. 10, compared with the optical operating apparatus 100 of FIG. 3, the optical operating apparatus 100b of the present embodiment additionally includes at least a lens 180. The lens 180 is disposed between the transparent supporting plate 120 and the image sensing module 150, and configured for focus the light beam 143 on the image sensing module 150. Because the lens 180 has a large viewing angle, a distance between the image sensing module 150 and the deformable unit 130 can be shorten due to the exist of the lens 180. Therefore, a thickness of the optical operating apparatus 100b can be reduced.

Figure 11:
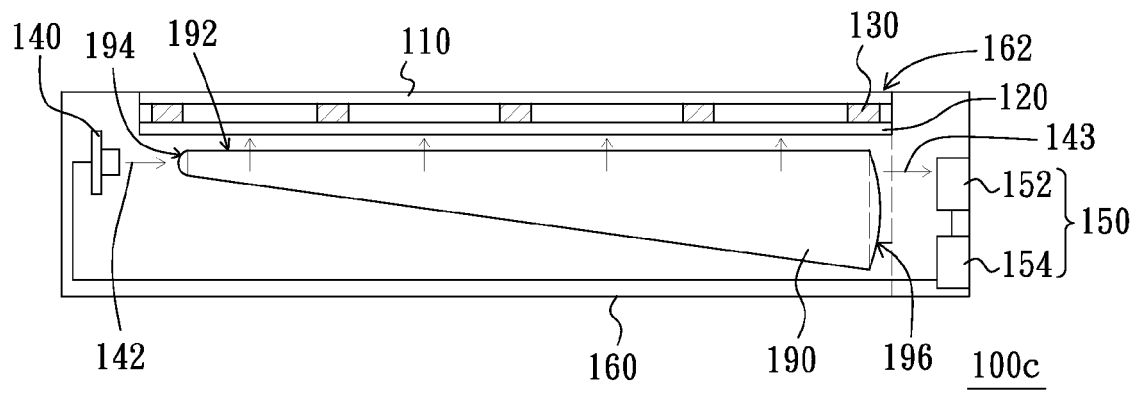
FIG. 11 is a schematic view of an optical operating apparatus in accordance with another embodiment of the present invention.

Referring to FIG. 11, compared with the optical operating apparatus 100 of FIG. 3, the optical operating apparatus 100c of the present embodiment additionally includes a lens 190 disposed under the transparent supporting plate 120. The lens 190 includes a flat surface 192, a first convex curve surface 194, and a second convex curve surface 196. The first convex curve surface 194 and the second convex curve surface 196 are separately connect with two opposite ends of the flat surface 192. The flat surface 192 is opposite to the transparent supporting plate 120, and the first convex curve surface 194 is opposite to the second convex curve surface 196. The light source 140 is arranged adjacent to the first convex curve surface 194, and the image sensing module 150 is arranged adjacent to the second convex curve surface 196. The lens 190 integrated into the optical operating apparatus 100c facilitates the image sensing module 150 determining the deformation of the deformable unit 130.

Figure 12:
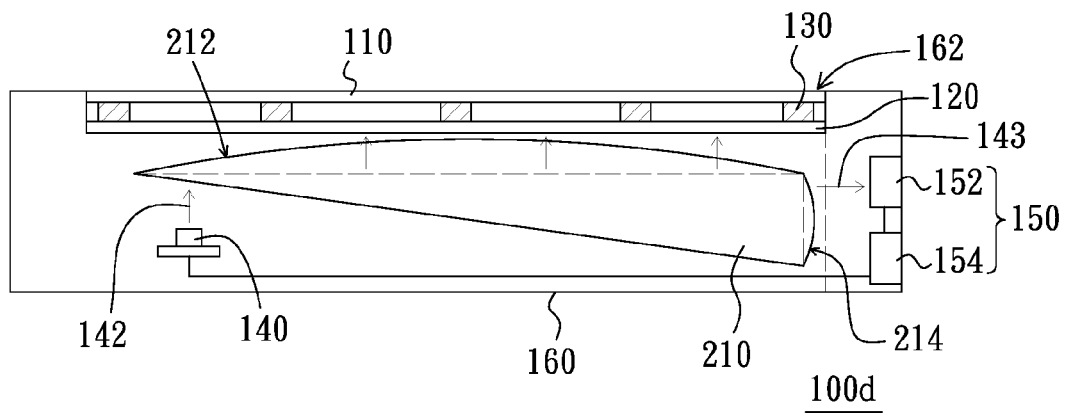
FIG. 12 is a schematic view of an optical operating apparatus in accordance with another embodiment of the present invention.

Referring to FIG. 12, compared with the optical operating apparatus 100 of FIG. 3, the optical operating apparatus 100d of the present embodiment additionally includes a lens 210 disposed under the transparent supporting plate 120. The lens 210 includes a first convex curve surface 212 and a second convex curve surface 214 adjacent to the first convex curve surface 212. The first convex curve surface 212 is opposite to the transparent supporting plate 120, and the image sensing module 150 is arranged adjacent to the second convex curve surface 214. The lens 210 integrated into the optical operating apparatus 100d facilitates the image sensing module 150 determining the deformation of the deformable unit 130.

Figure 13:
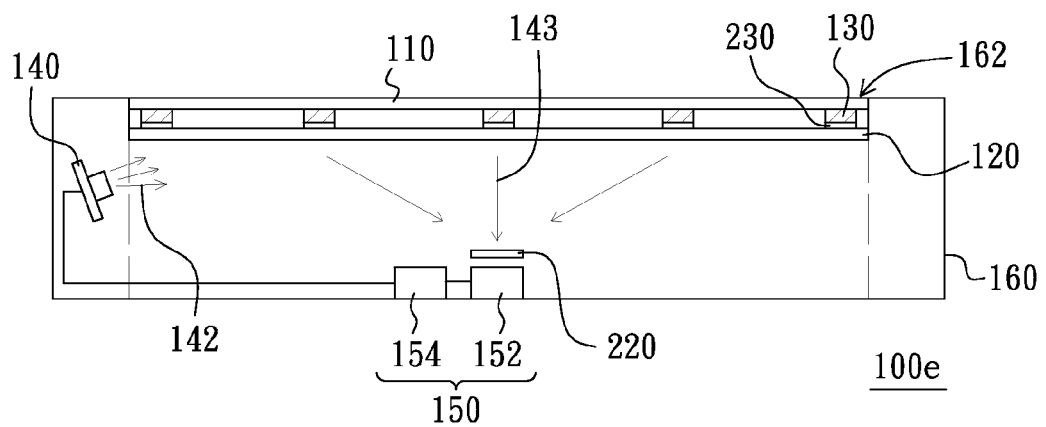
FIG. 13 is a schematic view of an optical operating apparatus in accordance with another embodiment of the present invention.

Referring to FIG. 13, compared with the optical operating apparatus 100 of FIG. 3, the optical operating apparatus 100e of the present embodiment additionally includes a filter 220 and a reflective pattern layer 230. The light source 140 is an infrared light emitting diode (IR LED). A wavelength of the light beam 142 provided by the light source 140 is in a range from about 750 nanometers to about 950 nanometers. The filter 220 is disposed in front of the image sensing module 150 and is between the deformable unit 130 and the image sensing module 150, for filtering off the light rays whose wavelength are out of the above range (i.e., the range from about 750 nanometers to about 950 nanometers). The reflective pattern layer 230 is disposed between the deformable unit 130 and the transparent supporting plate 120 to reflect the light rays whose wavelength is in the above range (i.e., the range from about 750 nanometers to about 950 nanometers). A shape of the reflective pattern layer 230 is similar to that of the deformable unit 130.

In the optical operating apparatus 100e, the reflective pattern layer 230 is applied to reflect the light rays whose wavelength is in the above range, and the filter 220 is applied to filter off the light rays whose wavelength is out of the above range, thus, noise sensed by the image sensing module 150 can be greatly decreased, thereby improving a sensing precision of the optical operating apparatus 100e. In addition, the filter 220 and the reflective pattern layer 230 can be applied to the optical operating apparatus 100a to 100d (shown in FIGS. 9 to 12) of the above embodiments.

In summary, the optical operating apparatus of the present invention employs the optical manner to sense the pressure force provided by the user, therefore, any operating error caused by static electronic or humidity can be prevented. In addition, the pressure force presses on the soft plate and the deformable unit, and the image sensing module is not pressed, thereby avoiding the damage of the image sensing module. Therefore, the optical operating apparatus of the present invention has a high reliability.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An optical operating apparatus, comprising:
   a soft plate configured for being pressed;
   a transparent supporting plate disposed under the soft plate;
   a deformable unit disposed between the soft plate and the transparent supporting plate, and having a pattern configuration, wherein the deformable unit deforms as applying an external force on the soft plate and restores after the external force is removed;
   a light source configured for providing a light beam to the transparent supporting plate and the deformable unit; and
   an image sensing module disposed on a transmitting path of the light beam reflected by the deformable unit, and a visual field of the image sensing module covering the whole deformable unit.

2. The optical operating apparatus as claimed in claim 1, wherein the deformable unit is made of an elastic material.

3. The optical operating apparatus as claimed in claim 1, wherein the pattern configuration is a predetermined reticular structure or a multi-line shaped structure.

4. The optical operating apparatus as claimed in claim 1, wherein the image sensing module is disposed under the transparent supporting plate.

5. The optical operating apparatus as claimed in claim 4, further comprising a light guide plate disposed between the transparent supporting plate and the image sensing module, and the light source being disposed adjacent to an incident surface of the light guide plate.

6. The optical operating apparatus as claimed in claim 4, further comprising a lens disposed between the transparent supporting plate and the image sensing module.

7. The optical operating apparatus as claimed in claim 1, further comprising a lens disposed under the transparent supporting plate, wherein the lens has a flat surface, a first convex curve surface and a second convex curve surface, the first and second convex curve surfaces respectively connect with two opposite ends of the flat surface, the flat surface is opposite to the transparent supporting plate, the first convex curve surface is opposite to the second convex curve surface, the light source is disposed adjacent to the first convex curve surface, and the image sensing module is disposed adjacent to the second convex curve surface.

8. The optical operating apparatus as claimed in claim 1, further comprising a lens disposed under the transparent supporting plate, wherein the lens has a first convex curve surface and a second convex curve surface adjacent to the first convex curve surface, the first convex curve surface is opposite to the transparent supporting plate, and the image sensing module is disposed adjacent to the second convex curve surface.

9. The optical operating apparatus as claimed in claim 1, further comprising a filter disposed in front of the image sensing module for filtering off light rays whose wavelengths are out of a wavelength range of the light beam provided by the light source.

10. The optical operating apparatus as claimed in claim 9, wherein the light source is an infrared light emitting diode.

11. The optical operating apparatus as claimed in claim 9, further comprising a reflective pattern layer disposed between the deformable unit and the transparent supporting plate for reflecting the light rays whose wavelengths are in a wavelength range of the light beam provided by the light source, wherein a shape of the reflective pattern layer is similar to a shape of the pattern configuration of the deformable unit.

12. The optical operating apparatus as claimed in claim 1, wherein the light source is a laser diode or a light emitting diode.

13. The optical operating apparatus as claimed in claim 1, wherein the image sensing module comprises:
   a sensing element, the visual field of the sensing element covering the whole deformable unit; and
   a processing element electrically connecting with the sensing element and the light source.

14. The optical operating apparatus as claimed in claim 13, wherein the sensing element and the processing element are integrated into a system-on-chip.

15. The optical operating apparatus as claimed in claim 1, further comprising a housing having an opening, wherein the soft plate is disposed at the opening, and the transparent supporting plate, the deformable unit, the light source and the image sensing module are disposed inside the housing.

16. A method for determining operation motion applied to the optical operating apparatus claimed in claim 1 to determine an operation motion, the method comprising:
   using the image sensing module of the optical operating apparatus to sense a deformed position and a deformed size of the deformable unit of the optical operating apparatus in different times; and
   determining an operation motion as moving or pressing by the image sensing module according to the deformed position and the deformed size of the deformable unit.

17. The method as claimed in claim 16, wherein when the deformed position of the deformable unit changes along with the time, the operation motion is determined as moving.

18. The method as claimed in claim 16, wherein when a portion of the deformed size of the deformable unit changes along with the time, the operation motion is determined as pressing.

* * * * *